US006438544B1

(12) United States Patent
Grimmer et al.

(10) Patent No.: US 6,438,544 B1
(45) Date of Patent: *Aug. 20, 2002

(54) METHOD AND APPARATUS FOR DYNAMIC DISCOVERY OF DATA MODEL ALLOWING CUSTOMIZATION OF CONSUMER APPLICATIONS ACCESSING PRIVACY DATA

(75) Inventors: Francine G. Grimmer, Poway; John Mark Chapra, Del Mar, both of CA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,533

(22) Filed: Oct. 1, 1999

Related U.S. Application Data

(60) Provisional application No. 60/102,832, filed on Oct. 2, 1998.

(51) Int. Cl.[7] .............................................. G66F 17/30
(52) U.S. Cl. ..................... 707/5; 707/2; 707/9; 707/10; 707/3
(58) Field of Search .............................. 707/3, 4, 5, 10, 707/103, 100, 102, 9, 2; 713/201, 202; 709/3, 9, 10; 706/47

(56) References Cited

U.S. PATENT DOCUMENTS

| | | | |
|---|---|---|---|
| 5,721,903 A | * 2/1998 | Amand et al. | ................. 707/5 |
| 5,835,087 A | 11/1998 | Herz et al. | |
| 5,910,988 A | 6/1999 | Ballard | |
| 6,240,416 B1 | * 5/2001 | Immon et al. | ................. 707/10 |

OTHER PUBLICATIONS

President William J. Clinton, Vice President Albert Gore, Jr., "A Framework For Global Electronic Commerce," Jul. 1997, at http://www.iitf.nist.gov/eleccomm/ecomm.htm, pp. 1–22.

Markoff, John, "U.S. and Europe Clash Over Internet Consumer Privacy," Jul. 1, 1998 at http://search.nytimes.com/search/daily/b..astweb?getdoc+site+site+35855+0+wAAA+P, pp. 1–3.

"OECD Guidelines on the Protection of Privacy and Transborder Flows of Personal Data," Oct. 1, 1997 at http://www.oecd.org/dsti/sti/it/secur/prod/PRIV–EN.HTM, pp. 1–23.

"FTC Releases Report on Consumer' Online Privacy", Report to Congress on Privacy Online, Jun. 4, 1998, at http://www.frc.gov/opa/9806/privacy2.htm, pp. 1–4.

(List continued on next page.)

*Primary Examiner*—Jean M. Corrielus
*Assistant Examiner*—Baoquoc N To
(74) *Attorney, Agent, or Firm*—Gates & Cooper

(57) ABSTRACT

To address the requirements described above, the present invention discloses a method, apparatus, and article of manufacture for providing access and accepting changes to personal information stored in a data warehouse. The method comprises the steps of accepting a privacy information request from a client, retrieving privacy metadata describing the selected privacy information, translating the privacy information request to a data warehouse-compliant query using the privacy information metadata, and transmitting the query to the data warehouse. The apparatus comprises a program storage device tangibly embodying instructions for performing the method steps above. The apparatus comprises a privacy metadata subsystem, communicatively coupled to a data warehouse for retrieving privacy metadata and a consumer access subsystem communicatively coupled to the data warehouse and the privacy metadata subsystem. The consumer access subsystem accepts a request for privacy information from the client, translates the request to a data warehouse-compliant query, transmits the query to the data warehouse, and forwards data responsive to the query to the client.

24 Claims, 5 Drawing Sheets

OTHER PUBLICATIONS

"High Tech Industry Leaders Announce Self–Regulatory Plan to Ensure Online Privacy," Online Privacy Alliance Letter to President Williamt J. Clinton, Jun. 3, 1998, (8 pages).

"Privacy and the National Information Infrastructure: Principles for Providing and Using Personal Information," Privacy Working Group, Information Policy Committee, Information Infrastructure Task Force, Jun. 6, 1995, at http://www.iitf.nist.gov/ipc/ipc/ipc–pubs/niiprivprin_final.htm, pp. 1–10.

"Directive 95/46/EC of the European Parliament and of the Council," Oct. 24, 1995, Official Journal of the European Communities, p. Nos. L281/31–L281/50.

"Directive 97/66/EC of the European Parliament and of the Council," Dec. 15, 1997, Official Journal of the European Communities, Jan. 30, 1998, p. Nos. L24/1–L24/8.

Katice et a. A prototype model for data warehouse security base metadata, NIW pp. 300–308, Aug. 1998.*

* cited by examiner

METHOD AND APPARATUS FOR DYNAMIC DISCOVERY OF DATA MODEL ALLOWING CUSTOMIZATION OF CONSUMER APPLICATIONS ACCESSING PRIVACY DATA

CROSS-REFERENCE TO RELATED APPLICATIONS

This application is related to the following co-pending and commonly assigned applications, each of which is hereby incorporated by reference herein:

U.S. Provisional Patent Application Serial No., 60/102,832, entitled "SYSTEM AND METHOD FOR PRIVACY-ENHANCED DATA WAREHOUSING," by Kenneth W. O'Flaherty, Reid M. Watts, David A. Ramsey, Adriaan W. Veldhuisen, Richard G. Stellwagen, Jr., Todd A. Walter, and Patric B. Dempster, filed Oct. 2, 1998;

Application Ser. No. 09/165,777, entitled "SYSTEM AND METHOD FOR MANAGING DATA PRIVACY IN A DATABASE MANAGEMENT SYSTEM," by Kenneth W. O'Flaherty, Reid M. Watts, and David A. Ramsey, Adriaan W. Veldhuisen, Richard G. Stellwagen, Jr., and Todd A. Walter, filed Oct. 2, 1998;

Application Ser. No. 09/165,784, entitled "PRIVACY-ENHANCED DATABASE," by Kenneth W. O'Flaherty, Reid M. Watts, and David A. Ramsey, Adriaan W. Veldhuisen, Richard G. Stellwagen, Jr., and Todd A. Walter, filed Oct. 2, 1998; and Application Ser. No. 09/165,457, entitled "PRIVACY-ENABLED LOYALTY CARD SYSTEM AND METHOD," by Kenneth W. O'Flaherty, Reid M. Watts, and David A. Ramsey, filed Oct. 2, 1998.

BACKGROUND OF THE INVENTION

1. Field of the Invention

The present invention relates to systems and methods of data storage and management, and in particular to a method and system for providing a client access to private data disseminable according to privacy rules.

2. Description of the Related Art

Database management systems are used to collect, store, disseminate, and analyze data. These large-scale integrated database management systems provide an efficient, consistent, and secure data warehousing capability for storing, retrieving, and analyzing vast amounts of data. This ability to collect, analyze, and manage massive amounts of information has become a virtual necessity in business today.

The information stored by these data warehouses can come from a variety of sources. One important data warehousing application involves the collection and analysis of information collected in the course of commercial transactions between businesses and consumers. For example, when an individual uses a credit card to purchase an item at a retail store, the identity of the customer, the item purchased, the purchase amount and other related information are collected. Traditionally, this information is used by the retailer to determine if the transaction should be completed, and to control product inventory. Such data can also be used to determine temporal and geographical purchasing trends.

Similar uses of personal data occur in other industries. For example, in banking, the buying patterns of consumers can be divined by analyzing their credit card transaction profile or their checking/savings account activity, and consumers with certain profiles can be identified as potential customers for new services, such as mortgages or individual retirement accounts. Further, in the telecommunications industry, consumer telephone calling patterns can be analyzed from call-detail records, and individuals with certain profiles can be identified for selling additional services, such as a second phone line or call waiting.

Additionally, data warehouse owners typically purchase data from third parties, to enrich transactional data. This enrichment process adds demographic data such as household membership, income, employer, and other personal data.

The data collected during such transactions is also useful in other applications. For example, information regarding a particular transaction can be correlated to personal information about the consumer (age, occupation, residential area, income, etc.) to generate statistical information. In some cases, this personal information can be broadly classified into two groups: information that reveals the identity of the consumer, and information that does not. Information that does not reveal the identity of the consumer is useful because it can be used to generate information about the purchasing proclivities of consumers with similar personal characteristics. Personal information that reveals the identity of the consumer can be used for a more focused and personalized marketing approach in which the purchasing habits of each individual consumer are analyzed to identify candidates for additional or tailored marketing.

Another example of an increase in the collection of personal data is evidenced by the recent proliferation of "membership" or "loyalty" cards. These cards provide the consumer with reduced prices for certain products, but each time the consumer uses the card with the purchase, information about the consumer's buying habits is collected. The same information can be obtained in an on-line environment, or purchases with smart cards, telephone cards, and debit or credit cards.

Unfortunately, while the collection and analysis of such data can be of great public benefit, it can also be the subject of considerable abuse. In the case of loyalty programs, the potential for such abuse can prevent many otherwise cooperative consumers from signing up for membership awards or other programs. It can also discourage the use of emerging technology, such as cash cards, and foster continuation of more conservative payment methods such as cash and checks. In fact, public concern over privacy is believed to be a factor holding back the anticipated explosive growth in web commerce. For the foregoing reasons, a privacy-enhanced data warehouse has been developed, as described in the above cross-referenced patent applications.

Data warehouse data models describe data structures and business rules to represent business requirements. Business rules can include privacy rules (which can reflect any combination of corporate privacy policies and legally required privacy policy rules) or other business rules. The logical data model consists of the entities, attributes, and relationships for those data elements stored in the warehouse. The physical data model represents the physical properties of those data elements, such as column data types and constraints, index assignments, and physical storage assignments.

As described in the foregoing patent applications, it is also beneficial to provide convenient access to personal data and privacy preferences to clients. This can be accomplished by client interface modules that allow consumers to access and verify the personal data stored about them in the data warehouse, along with their preferences for the use of that data.

Data warehouse applications that interact with the consumer to store and retrieve data to and from rows and columns within the warehouse, need to know about the tables, attributes, data types and relationships.

Unfortunately, client access applications and client interface modules are often written for the physical data model, but if the data model changes, the application and user interface must change. This can be very time consuming for the application developer.

Another problem occurs when developing consumer access applications that need to apply any data model with personal data. Such applications are general in nature, but must be customized for each installation and data model, thus preventing a turn-key approach.

What is needed is a system and method for providing consumer access to personal data and privacy preferences stored in a suitable data warehouse that can be used for a wide variety of changeable physical data models, changing privacy business rules, and evolving consumer applications. The present invention satisfies that need.

SUMMARY OF THE INVENTION

To address the requirements described above, the present invention discloses a method, apparatus, and article of manufacture for providing access and accepting changes to personal information stored in a data warehouse The method comprises the steps of accepting a privacy information request from a client, retrieving privacy metadata describing the selected privacy information, translating the privacy information request to a data warehouse-compliant query using the privacy information metadata, and transmitting the query to the data warehouse. The apparatus comprises a program storage device tangibly embodying instructions for performing the method steps above.

The apparatus comprises a privacy metadata subsystem, communicatively coupled to a data warehouse for retrieving privacy metadata and a consumer access subsystem communicatively coupled to the data warehouse and the privacy metadata subsystem. The consumer access subsystem accepts a request for privacy information from the client, translates the request to a data warehouse-compliant query, transmits the query to the data warehouse, and forwards data responsive to the query to the client.

The present invention describes a consumer access server and a consumer access application programming interface that use metadata to discover the logical/physical data model and privacy attributes and return the data to the user or consumer. Metadata is descriptive information about the structure and meaning of data and of the applications and processes that manipulate data. It describes the data in the data warehouse, such as table names, attribute names, table relationships, and physical characteristics such as attribute length. Using this information, the consumer access subsystem interprets the data model and privacy attributes, and presents the information to the client application through the application program interface. The application can then dynamically present the correct form or data to the client.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
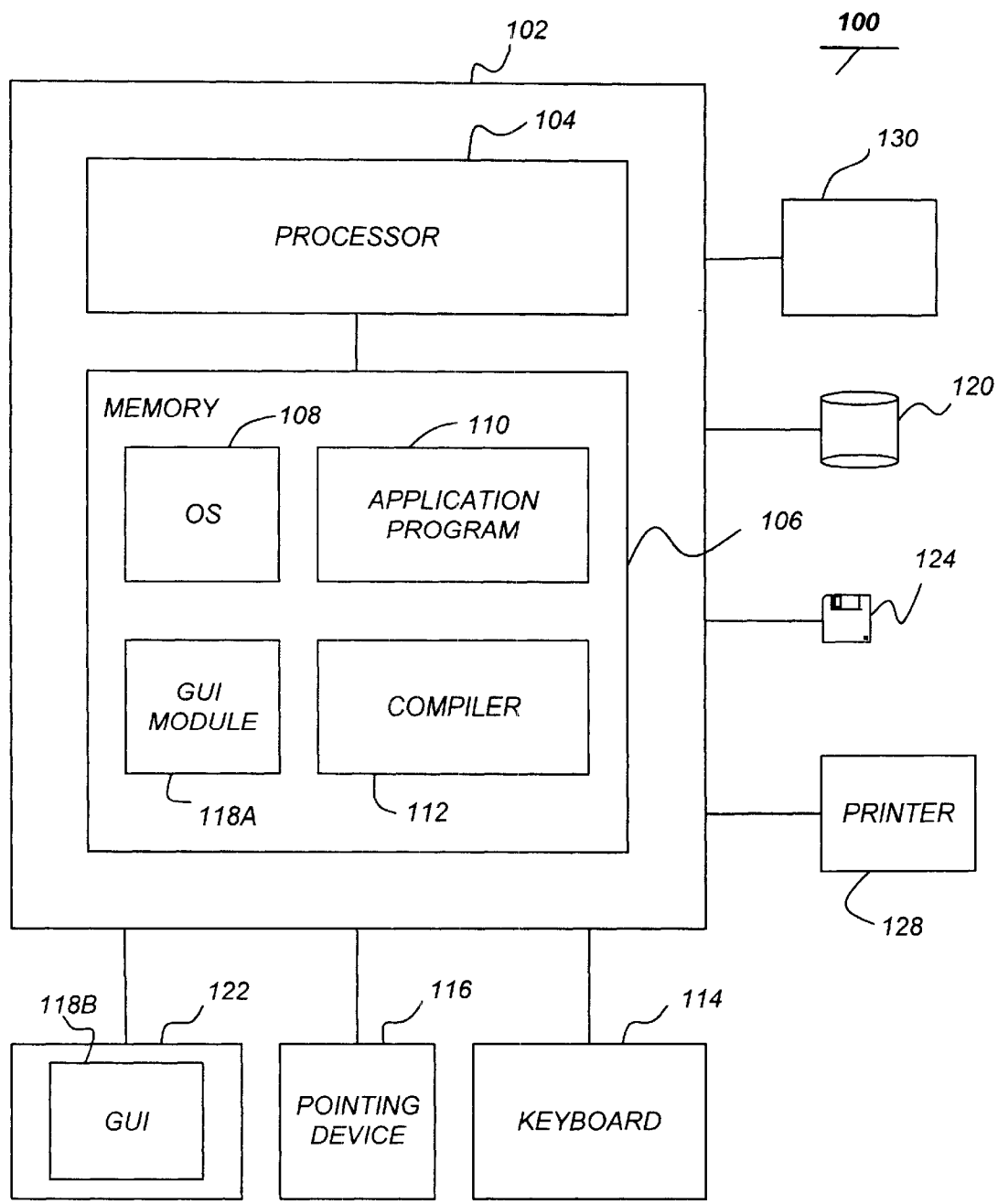
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "program storage device," "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
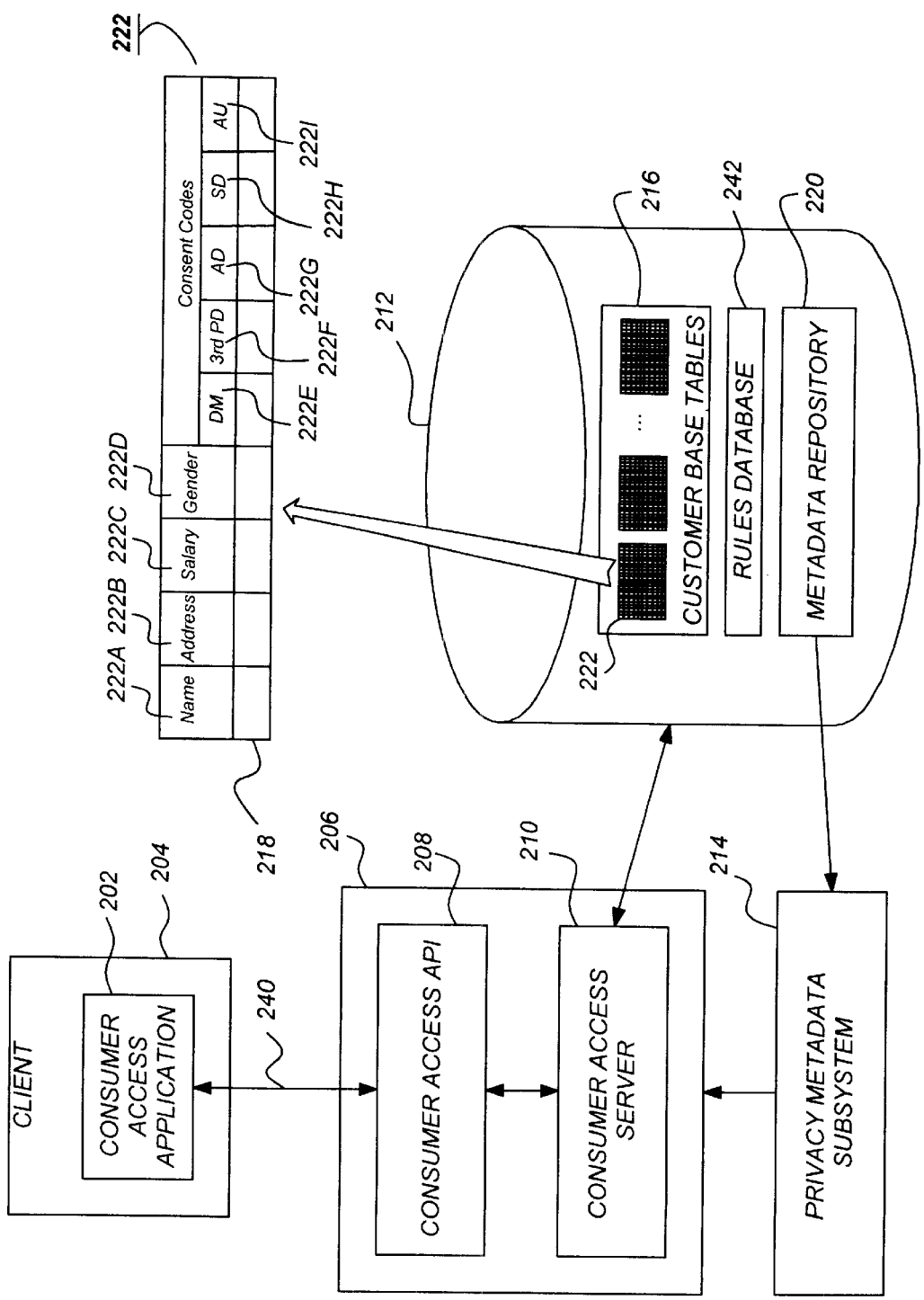
FIG. 2 is a system block diagram illustrating elements of one embodiment of the present invention.

FIG. 2 is a diagram showing one embodiment of the present invention. A data warehouse 212 maintains the physical data model and stores customer personal data and privacy preferences, as well as a privacy rules database 242. In one embodiment, the customer personal data and privacy preferences are stored in the form of customer base tables 216. Each customer base table includes attributes 222 organized into, for example, customer base table columns. The customer personal data attributes such as the customer's name 222A, address 222B, salary 222C, and gender 222D. The customer base tables also may include personal privacy preference attributes, such as direct marketing attribute 222E, which indicates whether the consumer has opted to receive direct marketing materials; third party disclosure attribute 222F, which indicates whether the consumer has elected to allow disclosure to third parties of their personal data, affiliate disclosure attribute 222G, which indicates whether the consumer has opted to allow disclosure of their data to affiliates; sensitive data attribute 222H, which indicates whether the consumer has opted to allow use of their sensitive data (which may include, for example, information about ethnicity, sexual preference, and religious beliefs); and automated decision attribute 222I, which indicates whether the consumer has opted to participate in automated decisions (for example, scoring algorithms for loan applications). In the illustrated embodiment, data relating to each particular customer is limited to a single row 218 in the customer base table 216. The dissemination of information within the data warehouse 212 is governed by a set of privacy rules that are stored in a rules database 242. Although illustrated in the data warehouse 212, the rules database 242 can reside elsewhere.

The data warehouse 212 also includes a repository 220 storing metadata regarding the content of the rules database 242, and the customer base tables 216. The metadata repository 220 includes metadata such as table names, attribute names, table relationships, and physical characteristics such as attribute length. The metadata repository 220 can also be resident externally from the data warehouse 212, if desired.

A client computer 204 such as the computer 102 described above, implements a consumer access application 202. The consumer access application 202 interfaces with the operating system and user interfaces of the client computer 202 to accept user commands such as a privacy information request and to present data such as responses to the request to the user.

The client computer 204 is communicatively coupled via a communication link 240 with a consumer access subsystem 206. The communication link 240 can be implemented through a modem and an ordinary public switched telephone network (PSTN), through a cellphone network, satellite transmission, a high speed ISDN or DSL line, or a combination of the foregoing media. Further, the protocols and interfaces for these communicates can be private, or through a public information transfer media such as the Internet using a browser at the client computer 202 and suitable web-implementing hardware and software at the consumer access subsystem 206. Based upon user input to the client computer 204, information is passed between the consumer access application 202 and the consumer access subsystem 206.

In one embodiment, the consumer access subsystem 206 includes a consumer access application program interface (API) 208. The consumer access API 208 interprets and communicates commands and command responses between the consumer access application 202 and the consumer access server 210. These privacy information commands and command responses can include requests for privacy information and responses to such requests. For example, a consumer may issue a request to view the privacy preferences defined by attributes 222E–222I, private data defined by attributes 222A–222D, or privacy rules stored in the rules database 242 through the consumer access API 208. The privacy information commands and command responses may include a request to change certain attributes or data through the same interface using the same techniques described with respect to privacy information retrieval defined herein. Similarly, the results of the request to view or change privacy preferences, privacy rules, or personal data are presented through the consumer access API 208.

The use of the consumer access API 208 allows the consumer access subsystem 206 to operate with a wide variety of consumer access applications 204, including different application versions. Differences between consumer access applications 202 in terms of communication protocols, data transfer, and formatting can be accounted for in the consumer access API 208, without requiring changes to the consumer access applications 202 resident on the customer's computers. For example, the consumer access API 208 can recognize different consumer access application versions (and different consumer access applications, for that matter), allowing it to properly format the commands for the remainder of the consumer access subsystem, and to properly format responses from the consumer access subsystem for presentation to the user on the client computer 204.

The consumer access subsystem 206 also includes a consumer access server 210, which is communicatively coupled to the consumer access API 208, the data warehouse 212, and a privacy metadata subsystem 214. The consumer access server 210 accepts privacy information requests (optionally through the consumer access API 208). Using these accepted requests, the consumer access server 210 retrieves privacy metadata describing the privacy information that is the subject of the privacy information request. In this way, the consumer access subsystem dynamically discovers information regarding the information in the data warehouse 212 including the data model.

In one embodiment, the consumer access server 210 obtains the privacy metadata by calling communicatively coupled privacy metadata subsystem 214. The privacy metadata subsystem connects to the metadata repository 220 in the data warehouse 212 to obtain descriptions of the customer base tables 216, views, and macros; to obtain information regarding data sources and targets, and to track the history of data changes.

Using the retrieved privacy metadata, the consumer access server 210 translates the privacy information request into a data warehouse 212 compliant query. The consumer access server 210 then transmits that query to the data warehouse 212. The data warehouse 212 executes the query, and returns results comprising privacy information responsive to the query to the consumer access server 210. In one embodiment, this is accomplished via the consumer access API 208, which formats the results for presentation by the consumer access application 202 on the client computer 204.

The consumer access server 210 can be an entity separate from the data warehouse 212, or may be incorporated into the data warehouse 212 itself. Further, although the privacy metadata subsystem 214 is depicted and described as a separate entity from the data warehouse 212 and the consumer access subsystem 206, this need not be the case.

Figure 3:
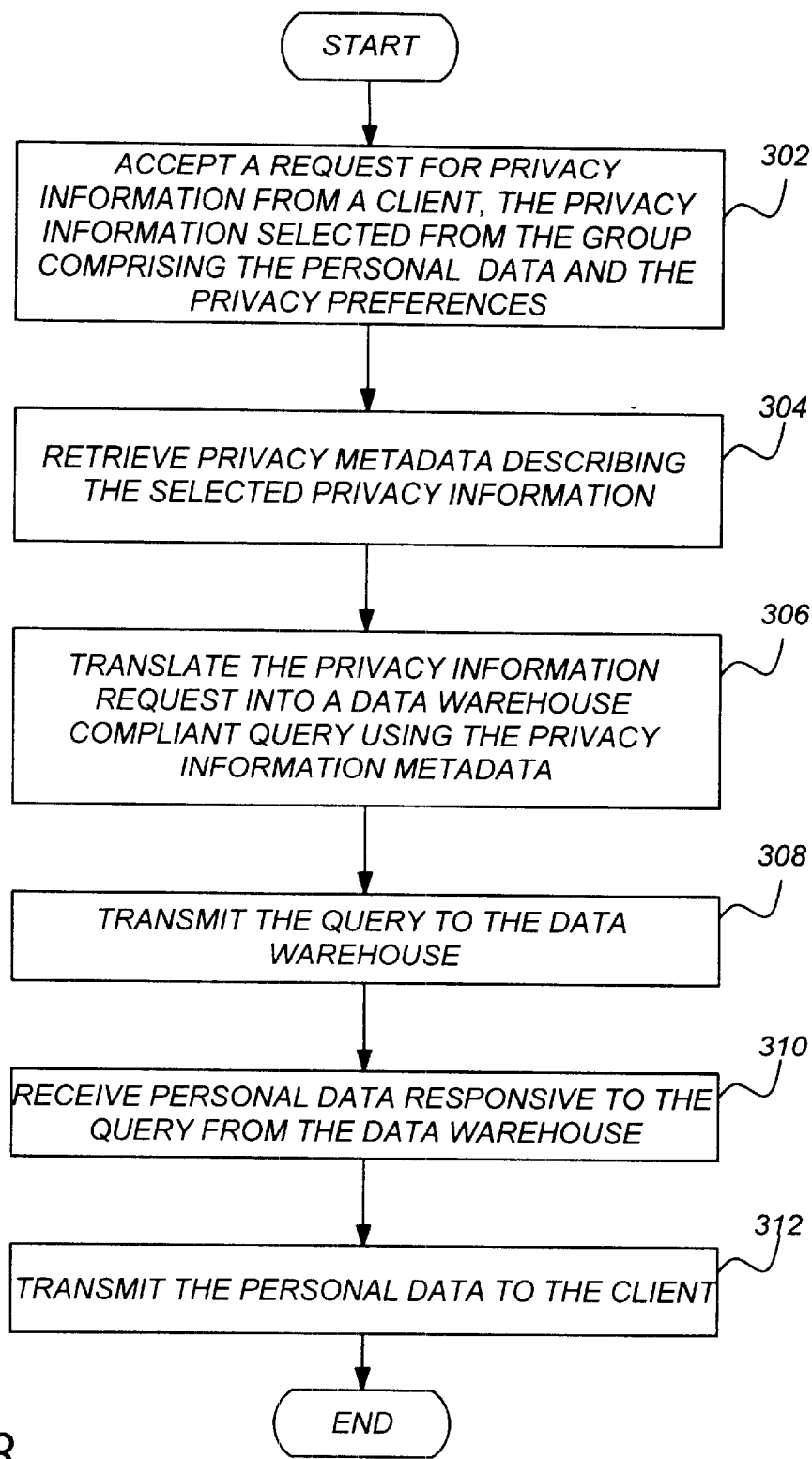
FIG. 3 is a flow chart illustrating the operations performed in one embodiment of the present invention.

FIG. 3 is a flow chart illustrating the operations performed in one embodiment of the present invention. First, a request for privacy information is accepted 302 from a client. The requested privacy information can include either personal data, privacy preferences, or both.

In one embodiment, this request is accomplished by the consumer using a consumer access application executing a client computer 204. The consumer access application 202 calls one or more the consumer access APIs 208 to retrieve the selected privacy information. The consumer access application APIs 208 then interact with the consumer access server 210 to process the request. Next, privacy metadata describing the selected privacy information is retrieved 304.

Figure 4:
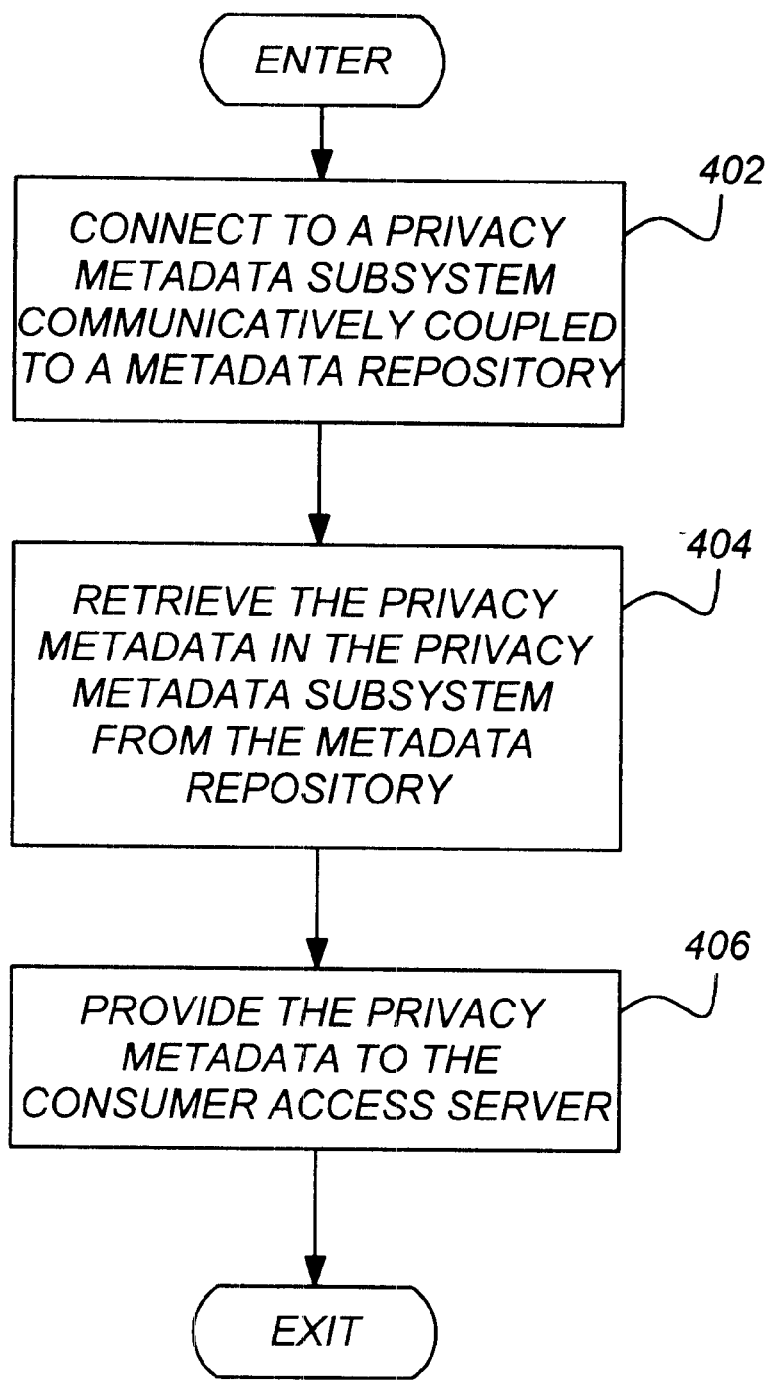
FIG. 4 is a flow chart presenting illustrative process steps used to retrieve the selected privacy information in an exemplary embodiment of the invention.

FIG. 4 is a flow chart presenting illustrative process steps used to retrieve the selected privacy information in an exemplary embodiment of the invention. A communication connection is established to the privacy metadata subsystem 214. The privacy metadata subsystem 214 retrieves 404 the privacy metadata (including data definitions for the privacy tables and attributes) from the communicatively coupled metadata repository 220, and returns 406 the privacy metadata information about the privacy rules, tables, attributes, and relationships to the consumer access server 210.

The privacy information request is then translated 306 into a data warehouse-compliant query to retrieve the information identified by the user's request. This task is accomplished using the retrieved privacy metadata information. In one embodiment, this step is accomplished by the consumer access server 210 working cooperatively with the consumer access API 208, however, this task can be accomplished by the consumer access server 210 alone as well.

The query is then transmitted 308 to the data warehouse. In one embodiment, this is accomplished when by establishing a connection between the consumer access server 210 and the data warehouse 212. Personal data responsive to the query is then received 310 from the data warehouse 212, and transmitted 312 to the client. In one embodiment, this is accomplished by reading the query responsive data into the consumer access server 210. The consumer access server 210 interprets the query response, and transmits the response to the consumer access API 208, which formats the response for the consumer access application 202, and transmits the response according to the proper protocol.

Figure 5:
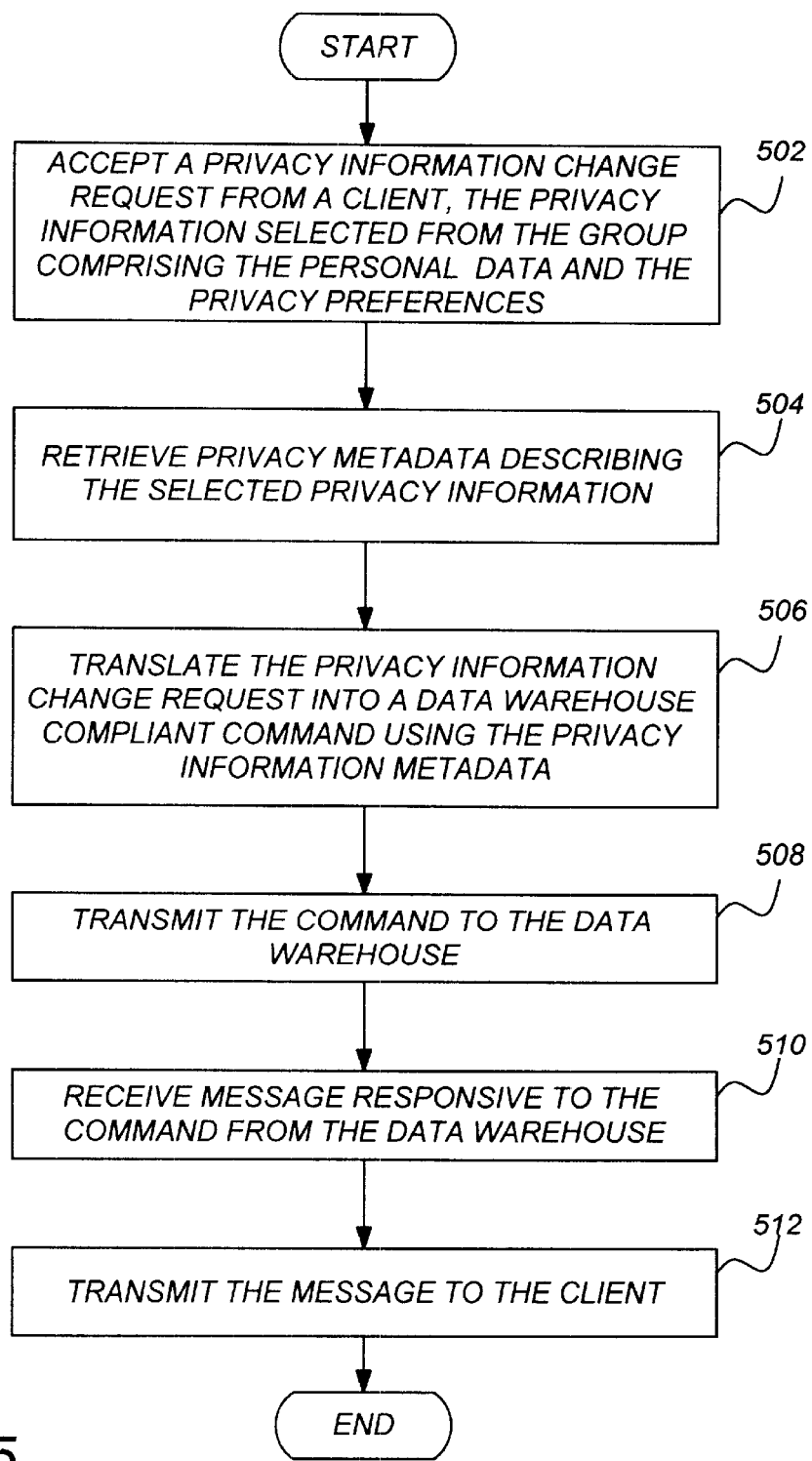
FIG. 5 is a flow chart illustrating representative process steps used to practice another embodiment of the present invention in which the user elects to change, add, or delete personal information stored in the data warehouse, or to change personal privacy preferences.

FIG. 5 is a flow chart illustrating representative process steps used to practice another embodiment of the present invention in which the user elects to change, add, or delete personal information stored in the data warehouse 212, or to change personal privacy preferences. First a privacy information change request is accepted 502 from a client 204. The privacy information change request is a request to change information, which can include either personal data or personal privacy preferences. Next, privacy metadata describing the selected privacy information is retrieved 504.

The privacy information change request is then translated 506 using the metadata to a data warehouse 212 compliant command and transmitted to the data warehouse 508. In one embodiment, the data warehouse 212 can return information to the client 204. For example, the personal data and personal privacy preferences can be transmitted to the client 204 using the techniques described above so the client can determine that the correct changes were made.

Conclusion

This concludes the description of the preferred embodiments of the present invention. In summary, the present invention describes a method, apparatus, and article of manufacture for providing access and accepting changes to personal information stored in a data warehouse The method comprises the steps of accepting a privacy information request from a client, retrieving privacy metadata describing the selected privacy information, translating the privacy information request to a data warehouse-compliant query using the privacy information metadata, and transmitting the query to the data warehouse. The apparatus comprises a program storage device tangibly embodying instructions for performing the method steps above.

The apparatus comprises a privacy metadata subsystem, communicatively coupled to a data warehouse for retrieving privacy metadata and a consumer access subsystem communicatively coupled to the data warehouse and the privacy metadata subsystem. The consumer access subsystem accepts a request for privacy information from the client, translates the request to a data warehouse-compliant query, transmits the query to the data warehouse, and forwards data responsive to the query to the client.

The foregoing description of the preferred embodiment of the invention has been presented for the purposes of illustration and description. It is not intended to be exhaustive or to limit the invention to the precise form disclosed. Many modifications and variations are possible in light of the above teaching. For example, consumer access API 208 and consumer access server 210 in same module. Further, metadata subsystem functions can be included in the consumer access server, or the data warehouse.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing access to privacy information stored in at least one privacy table stored in a data warehouse and disseminable according to at least one privacy rule, comprising the steps of:

accepting a privacy information request from a client, the privacy information selected from the group comprising personal data and at least one privacy preference;

retrieving privacy metadata describing the selected privacy information;

translating the privacy information request into a data warehouse-compliant query using the privacy information metadata; and transmitting the query to the data warehouse.

2. The method of claim 1, further comprising the steps of:
receiving personal data responsive to the query from the data warehouse; and
transmitting the personal data to the client.

3. The method of claim 1, wherein the privacy metadata includes information describing the privacy rule, the privacy table, and attributes associated with the personal data.

4. The method of claim 1, wherein the step of retrieving privacy metadata describing the selected privacy information comprises the steps of:
connecting to a privacy metadata subsystem communicatively coupled to a metadata repository storing the privacy metadata in the data warehouse; and
retrieving the privacy metadata in the privacy metadata subsystem from the metadata repository in the data warehouse; and
providing the privacy metadata to a consumer access server.

5. The method of claim 4, wherein the step of accepting a privacy information request comprises the steps of:
accepting a privacy information request in a consumer access application executing at a client; and
calling a consumer access application program interface in a consumer access server having access to the privacy metadata subsystem from the consumer access application.

6. An apparatus for providing access to privacy information stored in at least one privacy table stored in a data warehouse and disseminable according to at least one privacy rule, comprising:
means for accepting a privacy information request selected from a group comprising personal data and at least one privacy preference;
means for retrieving privacy metadata describing the selected privacy information;
means for translating the privacy information request into a data warehouse-compliant query using the privacy information metadata; and
means for transmitting the query to the data warehouse.

7. The apparatus of claim 6, further comprising:
means for receiving personal data responsive to the query from the data warehouse; and
means for transmitting the personal data to the client.

8. The apparatus of claim 6, wherein the privacy metadata includes information describing the privacy rule, the privacy table, and attributes associated with the personal data.

9. The apparatus of claim 6, wherein the step of retrieving privacy metadata describing the selected privacy information comprises the steps of:
means for connecting to a privacy metadata subsystem communicatively coupled to a metadata repository storing the privacy metadata in the data warehouse; and
means for retrieve the privacy metadata in the privacy metadata subsystem from the metadata repository in the data warehouse; and
means for providing the privacy metadata to a consumer access server.

10. The apparatus of claim 9, wherein the step of accepting a privacy information request comprises:
means for accepting a privacy information request in a consumer access application executing at a client; and
means for calling a consumer access application program interface in a consumer access server having access to the privacy metadata subsystem from the consumer access application.

11. A program storage device, readable by a computer, tangibly embodying at least one program of instructions executable by the computer to perform method steps of providing access to privacy information stored in at least one privacy table stored in a data warehouse and disseminable according to at least one privacy rule, the method comprising the steps of:
accepting a privacy information request selected from a group comprising personal data and at least one privacy preference;
retrieving privacy metadata describing the selected privacy information;
translating the privacy information request into a data warehouse-compliant query using the privacy information metadata; and
transmitting the query to the data warehouse.

12. The program storage device of claim 11, further comprising the steps of:
receiving personal data responsive to the query from the data warehouse;
transmitting the personal data to the consumer access application via the consumer access subsystem.

13. The program storage device of claim 11, wherein the privacy metadata includes information describing the privacy rule, the privacy table, and attributes associated with the personal data.

14. The program storage device of claim 11, wherein the step of retrieving privacy metadata describing the selected privacy information comprises the steps of:
connecting to a privacy metadata subsystem communicatively coupled to a metadata repository storing the privacy metadata in the data warehouse;
retrieve the privacy metadata in the privacy metadata subsystem from the metadata repository in the data warehouse; and
providing the privacy metadata to a consumer access server.

15. The program storage device of claim 14, wherein the step of accepting a privacy information request comprises the steps of:
accepting a privacy information request in a consumer access application executing at a client; and
calling a consumer access application program interface in a consumer access server having access to the privacy metadata subsystem from the consumer access application.

16. An apparatus for providing access to privacy information stored in at least one privacy table stored in a data warehouse and disseminable according to at least one privacy rule to a client, the apparatus comprising:
a privacy metadata subsystem, communicatively coupled to the data warehouse, for retrieving privacy metadata from the data warehouse;
a consumer access subsystem communicatively coupled to the data warehouse and the privacy metadata subsystem, for accepting a privacy information request from a client, the privacy information selected from a group comprising personal data and at least one privacy preference, for translating the privacy information request into a data warehouse compliant query using privacy information metadata retrieved from the privacy metadata system, and for transmitting the query to the data warehouse.

17. The apparatus of claim 16, wherein the consumer access subsystem further receives personal data responsive to the query from the data warehouse and transmits the personal data to the client.

18. The apparatus of claim 17, wherein the consumer access subsystem comprises:

a consumer access application program interface, communicatively coupleable with the client, for accepting the privacy information request from the client and for transmitting the personal data responsive to the query to the client; and a consumer access server, communicatively coupled to the consumer access application program interface and the data warehouse, for translating the privacy information request into the data warehouse compliant query using privacy information metadata received from the privacy metadata system, and for transmitting the query to the data warehouse.

19. A method of accepting changes to privacy information stored in at least one privacy table stored in a data warehouse and disseminable according to at least one privacy rule, comprising the steps of:

accepting a privacy information change request from a client, the privacy information selected from the group comprising personal data and privacy preferences;

retrieving privacy metadata describing the selected privacy information;

translating the privacy information request into a data warehouse-compliant command using the privacy information metadata; and transmitting the command to the data warehouse.

20. The method of claim 1, further comprising the steps of:

receiving a message responsive to the command from the data warehouse; and transmitting the message to the client.

21. An apparatus for accepting changes to privacy information stored in at least one privacy table stored in a data warehouse and disseminable according to at least one privacy rule, comprising the steps of:

means for accepting a privacy information change request from a client, the privacy information selected from the group comprising personal data and privacy preferences;

means for retrieving privacy metadata describing the selected privacy information;

means for translating the privacy information request into a data warehouse-compliant command using the privacy information metadata; and means for transmitting the command to the data warehouse.

22. The apparatus of claim 21, further comprising the steps of:

receiving a message responsive to the command from the data warehouse; and transmitting the message to the client.

23. A program storage device, readable by a computer, tangibly embodying at least one program of instructions executable by the computer to perform method steps of accepting changes to privacy information stored in at least one privacy table stored in a data warehouse and disseminable according to at least one privacy rule, the method steps comprising the steps of accepting a privacy information change request from a client, the privacy information selected from the group comprising personal data and privacy preferences;

retrieving privacy metadata describing the selected privacy information;

translating the privacy information request into a data warehouse-compliant command using the privacy information metadata; and transmitting the command to the data warehouse.

24. The program storage device of claim 23, wherein the method further comprises the method steps of:

receiving a message responsive to the command from the data warehouse; and transmitting the message to the client.

* * * * *